United States Patent [19]
Kim et al.

[11] Patent Number: 5,916,719
[45] Date of Patent: Jun. 29, 1999

[54] COMPOSITION OF PHOTOCONDUCTIVE LAYER FOR A COLOR DISPLAY PANEL

[75] Inventors: Min Ho Kim; Jae Ho Sim, both of Suwon-si, Rep. of Korea

[73] Assignee: Samsung Display Devices Co., Ltd., Suwon-si, Rep. of Korea

[21] Appl. No.: 08/935,449

[22] Filed: Sep. 23, 1997

[30] Foreign Application Priority Data

Dec. 4, 1996 [KR] Rep. of Korea ................ 96-61601
Dec. 4, 1996 [KR] Rep. of Korea ................ 96-61604

[51] Int. Cl.$^6$ .................................................. G03G 5/047
[52] U.S. Cl. ................................................. 430/59; 430/75
[58] Field of Search ......................... 430/58, 59, 75

[56] References Cited

U.S. PATENT DOCUMENTS

| | | | |
|---|---|---|---|
| 3,992,205 | 11/1976 | Wiedemann | 430/58 |
| 4,264,695 | 4/1981 | Kozima et al. | 430/58 |
| 4,724,338 | 2/1988 | Hoffmann et al. | 307/311 |
| 4,751,163 | 6/1988 | Hagiwara et al. | 430/59 |
| 5,452,113 | 9/1995 | Ikeno | 359/53 |

FOREIGN PATENT DOCUMENTS

| | | |
|---|---|---|
| 233750 | 10/1986 | Japan . |
| 214866 | 8/1990 | Japan . |
| 5165232 | 7/1993 | Japan . |
| 5173342 | 7/1993 | Japan . |
| 6-27694 | 2/1994 | Japan . |

*Primary Examiner*—John Goodrow

[57] ABSTRACT styrene-acrylic copolymer is used as an organic binder, thioxanxene derivative is used as an electron receptor and tetraphenylbutadiene derivative is used as an electron donor to produce a color display panel which has a low decomposition temperature, a high electron transferring ability and a charge maintenance ability to manufacture a color display panel without a change of brightness and color coordinates in a fluorescent screen.

4 Claims, 2 Drawing Sheets

COMPOSITION OF PHOTOCONDUCTIVE LAYER FOR A COLOR DISPLAY PANEL

BACKGROUND OF THE INVENTION (a) Field of the Invention

The present invention relates to a photoconductive layer for a color display panel, more specifically, to a composition of a photoconductive layer for a color display panel which comprises a styrene-acrylic copolymer as an organic binder, a thioxanthene derivative as an electron receptor and a tetraphenylbutadiene derivative as an electron donor. This composition has a low decomposition temperature, high electron transferring ability and charge maintenance ability to produce a color display panel without change of brightness and color coordinates in a fluorescent screen.

(b) Description of the Related Arts

A fluorescent layer for a color display panel is manufactured using a spinning method of a slurry coating method. First, a panel of a glass bulb is spun, a photoresist such as polyvinyl alcohol and ammonium chromate is coated thereon, and the panel is heated and dried. The panel is assembled with a mask assembly to produce a panel-mask assembly and the photoresist thereon is exposed to ultraviolet (uv) rays through a mask slot in the form of a dot or a stripe to stick onto the panel. The assembly is washed with deionized water to remove the photoresist which was not exposed to uv rays, and dried. A space between dots (or stripes) is coated with a nonfluorescent photoabsorbent such as a graphite solution, dried by heating and washed with hydrogen peroxide. The panel is washed by a high pressure spray of distilled water to remove the photoresist and the graphite. The panel is dried by rapidly spinning to form a black matrix. Red, green and blue fluorescent materials are applied between the black matrices to produce a fluorescent layer. There are two methods to apply fluorescent materials to the black matrix, namely a slurry method and an electrophotographic method. The slurry method is carried out as follows. A red fluorescent material slurry is coated on a panel by rapidly spinning the panel at a constant speed. The panel is heated to dry the fluorescent materials and exposed to light using a mask. After exposing, the mask is removed and the fluorescent material which was not exposed light is removed using deionized water to produce red fluorescent material dots or stripes. The same process mentioned above is used to produce green and blue fluorescent material dots or stripes. The final panel is composed of thousands of dots or stripes. The exposure to light is identical with the above process except that the fluorescent material is exposed to light using a light source with a special angle and on the fixed point not to overlap three fluorescent materials. Finally, the fluorescent layer is dried to form a fluorescent screen. The diameter difference of central dot and peripheral dot on the fluorescent layer produced by this method is severe and the form of the dots is distorted to make lower color purity.

The electrophotographic screening process in which the drawback of the above slurry method is eliminated, is described as follows.

A conductive material is coated on an interior surface of a faceplate panel of a color display panel to form a conductive layer and a photoconductive material is overcoated on the conductive layer to form a photoconductive layer. Then, a substantially uniform voltage is applied to the photoconductive layer of the panel and selected areas of the photoconductive layer are exposed to visible light to affect the charge thereon, without affecting the charge on the unexposed area of the photoconductive layer. The fluorescent layer is formed by spraying a fluorescent material powder onto the exposed area of the photoconductive layer.

While the photoconductive layer makes roles of an insulator in the dark, an electrolyte emits electrons or holes in the light source of uv or visible rays.

The structure of a fluorescent layer for a color display panel comprising a photoconductive layer is described in FIGS. 3 and 4. The photoconductive layer comprises an organic conductive layer (13) and a charge originator/charge carrier layer (15) coated on a polymer dispersed charge originator and charge carrier in a color display panel (11) in FIG. 3. Hole or electron carriers such as hydrazone, styryl, pyrazorine, triphenylamine compounds may be added to the polymer. In addition, the photoconductive layer is formed to coat an electron donor (25) on the organic conductive layer (13) and to laminate an electron receptor (27) thereon. The electron donor (25) and electron receptor (27) are dispersed in a binder polymer. The hole or electron carriers such as hydrazone, styryl, pyrazorine, triphenylamine compounds may be added to the polymer as a supporter of charge transport.

A composition of photoconductive layer contains an organic binder, an electron receptor, an electron donor and a residual solvent. The general organic binders used are polyvinyl cabazole, polymethylmethacylate or polypropylene carbonate. The electron receptors used are hydrazone, styryl, pyrazorine, and triphenylamine compounds which have low molecular and conductivity, and are used for copy machines. The corona charge (−) process has to be carried out because these compounds transport holes, which produce a large amount of ozone. As a method to solve this problem, Japanese laid open Pyung 2-21486 and Sho 61-233750 describe trinitrofluorenone (TNF) and antraquinone derivative as electron receptors and dimethylphenyl diphenylbutatriene (DMPBT) as electron donors. The above electron receptors and donors are not enough to transport and maintain electron charges and to use with the polymer binder. The imperfect combustion of the photoconductive material coated on a panel occurs in the process for sealing of a panel/funnel at the temperature of 450° C., because the dimethylphenyl diphenylbutatriene decomposes at high temperatures. Accordingly, more than 10% of the photoconductive materials remain thereby decreasing fluorescent brightness and color coordinate for a color display panel.

SUMMARY OF THE INVENTION

Accordingly, the present invention is intended to overcome the above-described disadvantage of conventional arts and to provide a composition for a photoconductive layer for a color display panel which has a low decomposition temperature, high electron transferring ability and charge maintenance ability to produce a color display panel without change of brightness and color coordinates in a fluorescent screen.

An embodiment of the present invention provides a composition for a photoconductive layer for a color display panel comprising a styrene acrylic copolymer as an organic binder expressed as formula 1 below, a thioxanthene derivative as an electron acceptor expressed as formula 2 below, a tetraphenyl butadiene derivative as an electron donor expressed as formula 3 below and a solvent.

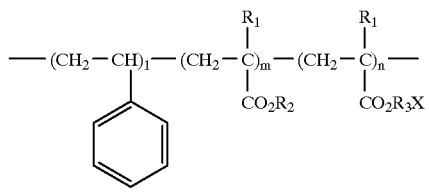

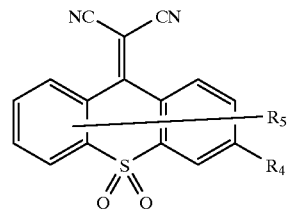

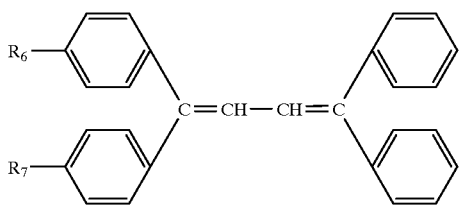

wherein, $R_1$ and $R_2$ are independently hydrogen or an alkyl group, $R_3$ is an alkyl group or an alkylene group and X is a polar group, and I, m and n may change for control of the concentration of photoconductive material and surface charge, $R_4$ is a carbonyl group substituted with an alkyl group, an alkoxy group or an aryl group, $R_5$ is selected from the group consisting of hydrogen, halogen, an alkyl group, an alkoxy group, a cyano group, a nitro group, an ester group and a trifluoromethyl group, and $R_6$ is a dimethylamine group or a methoxy group and $R_7$ is hydrogen, a methoxy group or a dimethylamine group.

The preferred composition comprises of 4–26 weight % of the styrene acrylic copolymer as an organic binder. When below 4 weight % of the organic binder is used in the present invention, the surface voltage is not enough and the thickness of the layer is thin. In addition, when above 26 weight % of the organic binder is used in the present invention, the thickness of the layer is greater than necessary.

The preferred composition comprises of 0.2–1.8 weight % of a thioxanthene derivative as an electron donor. When below 0.2 weight % or above 1.8 weight % of the electron donor is used in the invention, the surface voltage drops below 150 V and the surface voltage ratio according to time decreases.

The preferred composition comprises of 0.8–4.8 weight % of a tetraphenyl butadiene derivative. When below 0.8 weight % or above 4.8 weight % of the electron donor is used in the invention, the surface voltage ratio according to time drops below 0.7 V.

The preferred solvent is selected from the group consisting of toluene, alcohol and acetone.

The preferred $R_4$ in formula 2 is selected from the group consisting of ethoxycarbonyl, butoxycarbonyl, phenoxycarbonyl, benzyloxycarbonyl, ethylcarbonyl, propylcarbonyl, butylcarbonyl and t-butylcarbonyl.

An embodiment of the present invention provides a thioxanxene derivative as an electron acceptor for a photoconductive layer of a color display panel expressed in formula 2.

The preferred $R_4$ in formula 2 is selected from the group consisting of ethoxycarbonyl, butoxycarbonyl, phenoxycarbonyl, benzyloxycarbonyl, ethylcarbonyl, propylcarbonyl, butylcarbonyl and t-butylcarbonyl.

The electron donor and electron receptor are produced as a complex body to have good electron producing ability. Insulating materials with good adherence property and used as electrophotographic fluorescent materials are used as the polymer. For example, polystryrene, polymetacrylate, alpha methylstyrene and copolymers thereof are used. The coating of an organic conductive layer and electron transport material is carried out using spin coating, wirebar coating and roll coating, etc. The thickness of an electron producing layer and a transport layer is below 5 microns as shown in FIG. 3. In FIG. 4, each transport layer is preferred to be below 3 microns.

BRIEF DESCRIPTION OF THE DRAWINGS

The present invention will now be described in greater detail, with elation to the accompanying drawing, in which.

DETAILED DESCRIPTION OF THE EMBODIMENTS

Figure 1:
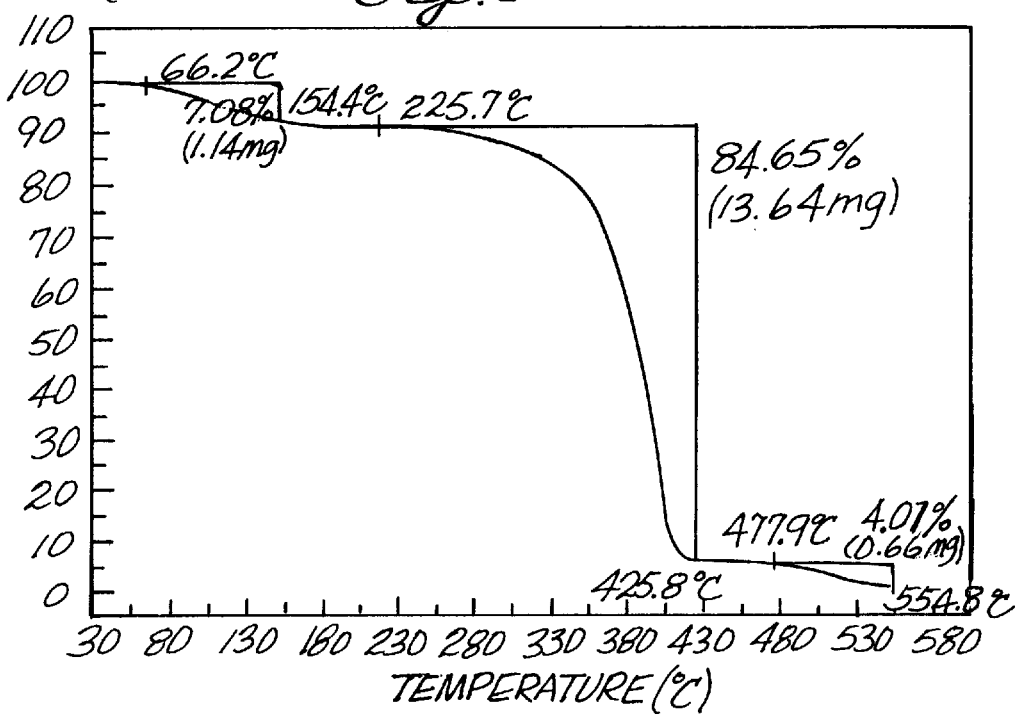
FIG. 1 is a graph illustrating thermal decomposition according o temperature of a photoconductive composition for a conventional color display panel.

Although the invention is described with reference to particular examples it is to be understood that the invention is not limited to the particular examples herein described.

EXAMPLE 1

20 g (0.069 mol) of 9-oxo-9H-thioxanthene-3-carboxylic acid and 23.8 g (0.173 mol) of 1-bromobutane were dissolved in 250 ml of dimethylformamide (DMF) and a small amount of $NaHCO_3$ was added to react at 70° C. for 18 hours. The reactant was added to a large amount of distilled water and an organic layer was produced by separation. The organic layer was purified by performing column separation to obtain 9-oxo-9H-thioxanthene-3-butyl ester and marononitryl. 3.6 g (0.054 mmol) of 9-oxo-9H-thioxanthene-3-butyl ester and marononitryl were dissolved in dichloromethane and a small amount of tetrachlorotitanium was added at room temperature and stirred for 1 hour while cooling. Then, 55 ml of pyridine was added at room temperature and reacted for 12 hours. After reaction, distilled water was added to obtain an organic layer, purifying by performing column separation and dried to produce 15.6 g of thioxanthene derivative of formula 2 in which $R_4$ is a butylester group.

9.5 weight % of styrene acrylic copolymer (SEKISUI CHEMICAL Co. S-LECP) as an organic polymer, 0.8 weight % of di-diethylamine tetraphenyl butadiene as an electron donor and 0.33 weight % of thioxanthene derivative of formula 2 in which $R_4$ is an ethoxycarbonyl group as an electron receptor were mixed for 5 hours to produce a photoconductive material. The material was spincoated on the organic conductive layer to produce a photoconductive layer to form a fluorescent layer of 4 micron. The photoconductive layer was carried out by corona charging of +40 kV and exposed to light from a high pressure Hg lamp of 400 lux to examine the charge property. After charging the initial surface voltage $V_0$, the ratio of surface voltage change after 1 min $V_1/N_0$, the remaining voltage $V_r$ were measured. $V_0$ was +450 V, the rate of dark decay $V_1/N_0$, was 0.97 and $V_r$ was below 30 V.

EXAMPLE 2

Example 1 was repeated except diethylamine tetraphenylbutadiene was used as an electron donor. The results were similar to the results of example 1.

EXAMPLE 3

Example 1 was repeated except dimethoxy tetraphenylbutadiene was used as an electron donor. The results were similar to the results of example 1.

EXAMPLE 4

Example 1 was repeated except that a thioxanthene derivative of formula 2 wherein $R_4$ was a butoxycarbonyl group was used as an electron receptor. The results were similar to the results of example 1.

EXAMPLE 5

Example 1 was repeated except that a thioxanthene derivative of formula 2 wherein $R_4$ was a t-butyl group was used as an electron receptor. The results were similar to the results of example 1.

EXAMPLE 6

Example 1 was repeated except thioxanthene derivative of formula 2 wherein $R_4$ was a phenoxycarbonyl group was used as an electron receptor. The results were similar to the results of example 1.

EXAMPLE 7

Example 1 was repeated except that a thioxanthene derivative of formula 2 wherein $R_4$ was an octylcarbonyl group was used as an electron receptor. The results were similar to the results of example 1.

EXAMPLE 8

Example 1 was repeated except that a thioxanthene derivative of formula 2 wherein $R_4$ was a butoxycarbonyl group and $R_5$ was a cyano group was used as an electron receptor. The results were similar to the results of example 1.

EXAMPLE 9

Example 1 was repeated except that diethylamine tetraphenylbutadiene was used as an electron donor and a thioxanthene derivative of formula 2 wherein $R_4$ was a buthoxycarbonyl group was used as an electron receptor. The results were similar to the results of example 1.

EXAMPLE 10

Example 1 was repeated except that diethylamine tetraphenylbutadiene was used as an electron donor and a thioxanthene derivative of formula 2 wherein $R_4$ was a t-butyl group was used as an electron receptor. The results were similar to the results of example 1.

EXAMPLE 11

Example 1 was repeated except that diethylamine tetraphenylbutadiene was used as an electron donor and a thioxanthene derivative of formula 2 wherein $R_4$ was a phenoxycarbonyl group was used as an electron receptor. The results were similar to the results of example 1.

EXAMPLE 12

Example 1 was repeated except that diethylamine tetraphenylbutadiene was used as an electron donor and a thioxanthene derivative of formula 2 wherein $R_4$ was an octoxycarbonyl group was used as an electron receptor. The results were similar to the results of example 1.

EXAMPLE 13

Example 1 was repeated except that diethylamine tetraphenylbutadiene was used as an electron donor and a thioxanthene derivative of formula 2 wherein $R_4$ was a t-butyl group and $R_5$ was a cyano group was used as an electron receptor. The results were similar to the results of example 1.

EXAMPLE 14

Example 1 was repeated except that diethylamine tetraphenylbutadiene was used as an electron donor and a thioxanthene derivative of formula 2 wherein $R_4$ was a butoxycarbonyl group was used as an electron receptor. The results were similar to the results of example 1.

EXAMPLE 15

Example 1 was repeated except that a dimethoxy tetraphenylbutadiene was used as an electron donor and thioxanthene derivative of formula 2 wherein $R_4$ was a t-butyl group was used as an electron receptor. The results were similar to the results of example 1.

EXAMPLE 16

Example 1 was repeated except that dimethoxy tetraphenylbutadiene was used as an electron donor and a thioxanthene derivative of formula 2 wherein $R_4$ was a phenoxycarbonyl group was used as an electron receptor. The results were similar to the results of example 1.

EXAMPLE 17

Example 1 was repeated except that dimethoxy tetraphenylbutadiene was used as an electron donor and a thioxanthene derivative of formula 2 wherein $R_4$ was an octoxycarbonyl group was used as an electron receptor. The results were similar to the results of example 1.

EXAMPLE 18

Example 1 was repeated except that dimethoxy tetraphenylbutadiene was used as an electron donor and a thioxanthene derivative of formula 2 wherein $R_4$ was a t-butyl group and $R_5$ was a cyano group was used as an electron receptor. The results were similar to the results of example 1.

COMPARATIVE EXAMPLE

Example 1 was repeated except that 10.5 weight % of polypropylene was used as an organic binder, 0.42 weight % of trinitrofluorenone was used an electron receptor and 1.5 weight % was used as an electron receptor. The results were similar to the results of example 1.

The weight change of photoconductive layers produced in example 1 to example 18 and comparative example were measured by using a DT/TGA machine while increasing the temperature to 500° C. at the speed of 10° C./min. The results thereof are shown in table I below.

TABLE 1

|  | initial surface voltage $V_0(V)$ | rate of dark decay $V_1/N_0(v)$ | remaining voltage Vr (v) |
|---|---|---|---|
| EXAMPLE 1 | +450 | 0.97 | 30 |
| EXAMPLE 2 | 440 | 0.96 | 20 |
| EXAMPLE 3 | 435 | 0.95 | 20 |
| EXAMPLE 4 | 420 | 0.96 | 25 |
| EXAMPLE 5 | 380 | 0.98 | 17 |
| EXAMPLE 6 | 415 | 0.97 | 15 |
| EXAMPLE 7 | 425 | 0.96 | 10 |
| EXAMPLE 8 | 400 | 0.95 | 20 |
| EXAMPLE 9 | 446 | 0.97 | 15 |
| EXAMPLE 10 | 380 | 0.95 | 18 |
| EXAMPLE 11 | 420 | 0.95 | 25 |
| EXAMPLE 12 | 470 | 0.96 | 30 |
| EXAMPLE 13 | 575 | 0.96 | 20 |
| EXAMPLE 14 | 560 | 0.98 | 25 |
| EXAMPLE 15 | 395 | 0.95 | 17 |
| EXAMPLE 16 | 420 | 0.97 | 20 |
| EXAMPLE 17 | 398 | 0.97 | 21 |
| EXAMPLE 18 | 430 | 0.97 | 15 |
| COMPARATIVE EXAMPLE | 350 | 0.91 | 40 |

Figure 2:
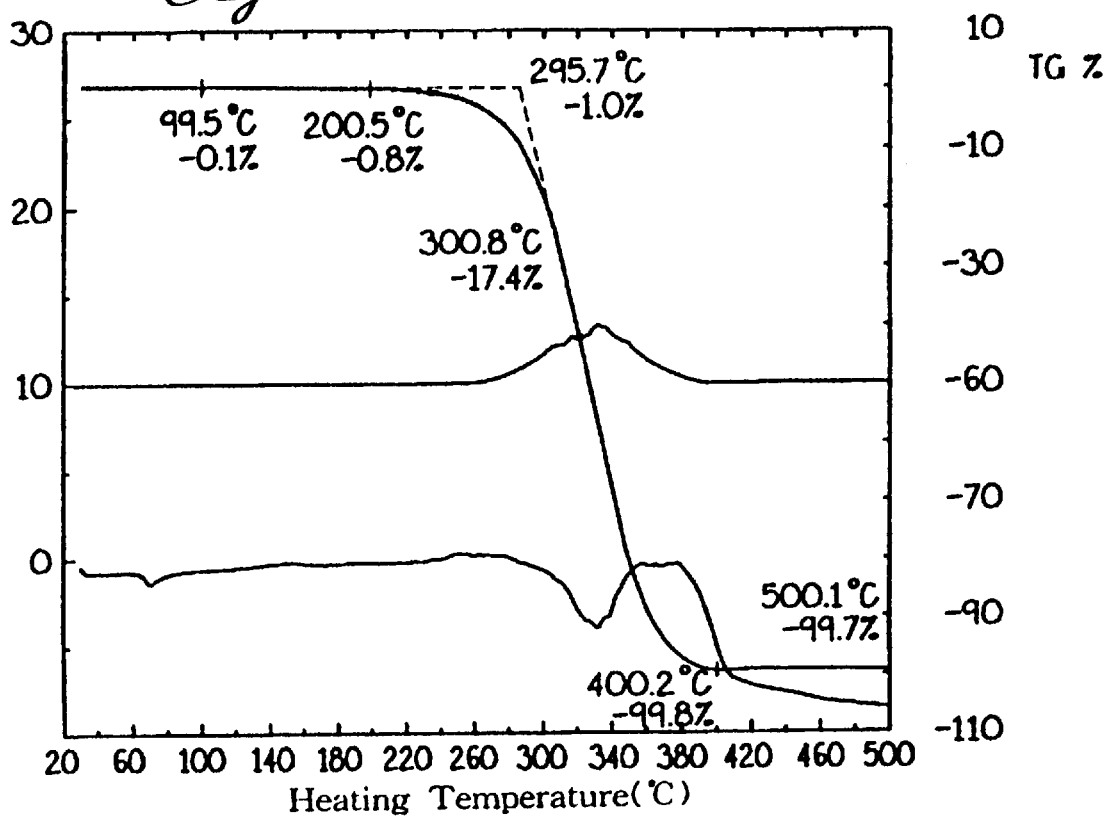
FIG. 2 is a graph illustrating thermal decomposition according o temperature of a photoconductive composition for a display panel of the ~resent invention.
Figure 3:
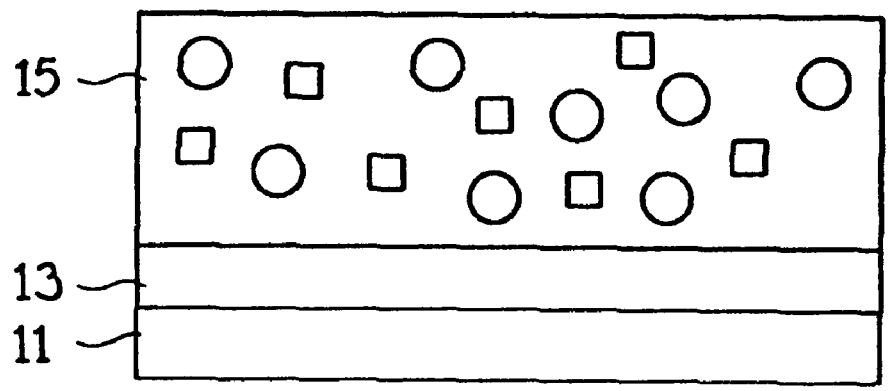
FIG. 3 is a cross-sectional view of a photoconductive layer for a color display panel.
Figure 4:
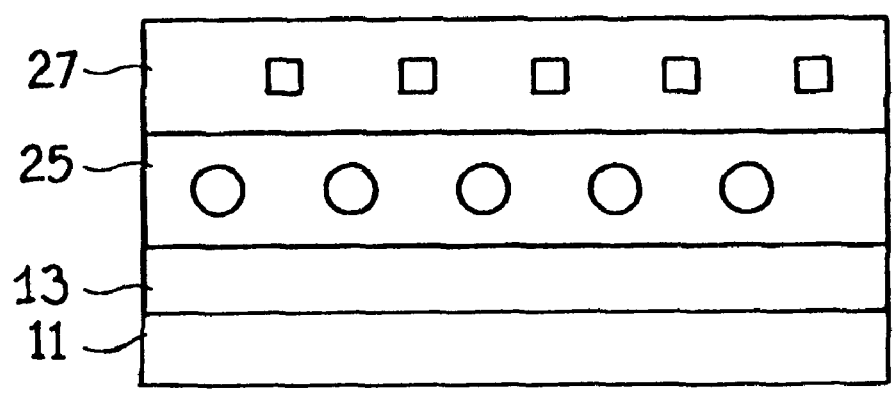
FIG. 4 is a cross-sectional view of a photoconductive layer for a color display panel.

The thermal decomposition of the photoconductive compositions of the above examples had lower decomposition temperatures and was 99.8% decomposed as compared to that of the conventional photoconductive composition. This fact is shown in FIGS. 1 and 2.

The photoconductive composition for a color display panel according to the present invention has a low decomposition temperature and an excellent thermal decomposition property. Therefore, an organic material did not remained to have no change of brightness of the fluorescent screen and color coordinate. Moreover, while TNF was not used because it is known to be a carcinogen and pollutant, the thioxanthene derivative and the tetraphenyl butadiene derivative in the photoconductive composition according to the present invention has no environmental problems.

What is claimed is:

1. A composition for a photoconductive layer for a color display panel comprising:

a styrene acrylic copolymer as an organic binder expressed as formula 1:

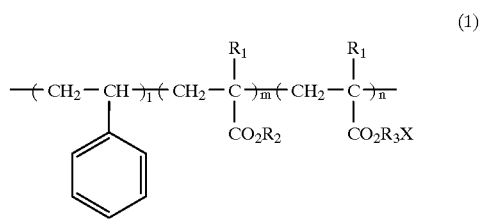

(1)

a thioxanthene derivative as an electron acceptor expressed as formula 2:

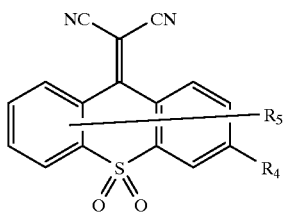

(2)

a tetraphenyl butadiene derivative as an electron donor expressed as formula 3:

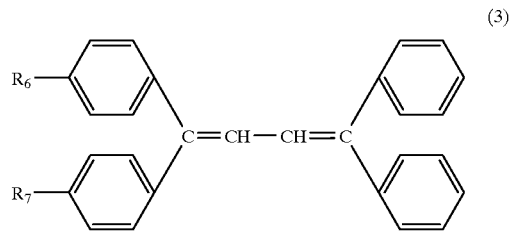

(3)

and a solvent;

wherein, $R_1$ and $R_2$ are each independently hydrogen or an alkyl group, $R_3$ is an alkyl group or an alkylene group and X is a polar group, and l, m and n may change for control of the concentration of a photoconductive material and surface charge, $R_4$ is a carbonyl group substituted with an alkyl group, an alkoxy group or an aryl group, $R_5$ is selected from the group consisting of hydrogen, halogen, alkyl groups, alkoxy groups, cyano groups, nitro groups, ester groups and trifluoromethyl groups, $R_6$ is a dimethylamine group or a methoxy group, and $R_7$ is hydrogen, a methoxy group or a dimethylamine group.

2. The composition for a photoconductive layer for a color display panel of claim 1, wherein said composition comprises 4–26 weight % of said styrene acrylic copolymer, 0.2–1.8 weight % of said thioxanthene derivative and 0.8–4.8 weight % of said tetraphenyl butadiene derivative.

3. The composition for a photoconductive layer for a color display panel of claim 1, wherein said solvent is selected from the group consisting of toluene, alcohol and acetone.

4. The composition for a photoconductive layer for a color display panel of claim 1, wherein $R_4$ in formula 2 is selected from the group consisting of ethoxycarbonyl group, butoxycarbonyl group, phenoxycarbonyl group, benzyloxycarbonyl group, ethylcarbonyl group, propylcarbonyl group, butylcarbonyl group and t-butylcarbonyl group.

* * * * *